US011470212B2

(12) United States Patent
Tanaka et al.

(10) Patent No.: US 11,470,212 B2
(45) Date of Patent: Oct. 11, 2022

(54) INFORMATION PROCESSING APPARATUS AND IMAGE FORMING SYSTEM

(71) Applicant: FUJIFILM Business Innovation Corp., Tokyo (JP)

(72) Inventors: Kumiko Tanaka, Kanagawa (JP); Masao Omori, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/318,087

(22) Filed: May 12, 2021

(65) Prior Publication Data

US 2022/0210284 A1     Jun. 30, 2022

(30) Foreign Application Priority Data

Dec. 25, 2020   (JP) .............................. JP2020-217051

(51) Int. Cl.
*H04N 1/00* (2006.01)

(52) U.S. Cl.
CPC ..... *H04N 1/00724* (2013.01); *H04N 1/00726* (2013.01); *H04N 1/00732* (2013.01); *H04N 1/00734* (2013.01); *H04N 2201/0082* (2013.01)

(58) Field of Classification Search
CPC ........... H04N 1/00724; H04N 1/00726; H04N 1/00732; H04N 1/00737; H04N 1/00734; H04N 2201/0082
See application file for complete search history.

(56) References Cited

U.S. PATENT DOCUMENTS

| 6,183,561 B1* | 2/2001 | Belotserkovsky ........................... G01B 11/0625 118/413 |
| 2009/0009803 A1* | 1/2009 | Takeuchi ........... H04N 1/00832 358/1.15 |
| 2011/0079716 A1* | 4/2011 | Ganapathiappan .......................... C09B 47/0673 540/140 |
| 2013/0077118 A1* | 3/2013 | Komiyama .............. B41J 3/445 358/1.13 |
| 2014/0377450 A1* | 12/2014 | Knorr ...................... B05C 5/00 427/9 |
| 2018/0189617 A1* | 7/2018 | Feng ................. G06K 15/4025 |
| 2019/0260889 A1* | 8/2019 | Kanematsu ........ H04N 1/00244 |
| 2019/0265607 A1* | 8/2019 | Ishimoto ............ G03G 15/5062 |
| 2019/0376891 A1* | 12/2019 | Namiki .................. G01N 29/11 |
| 2020/0004178 A1* | 1/2020 | Yamamoto ........... G03G 21/203 |
| 2020/0016907 A1 | 1/2020 | Ogushi |
| 2020/0249889 A1* | 8/2020 | Igarashi ................. B41J 11/009 |

FOREIGN PATENT DOCUMENTS

| JP | 5110793 B2 | 12/2012 |
| JP | 2020-6628 A | 1/2020 |
| JP | 2020-101739 A | 7/2020 |

\* cited by examiner

*Primary Examiner* — Moustapha Diaby
(74) *Attorney, Agent, or Firm* — Oliff PLC

(57) ABSTRACT

An information processing apparatus includes a sensor that detects a property of a specific sheet, and a processor configured to output information about a sheet that satisfies a set condition regarding a relationship with the property detected by the sensor. The sensor includes at least an infrared sensor that detects the property by emitting an infrared ray to a sheet or an electric sensor that detects the property on the basis of an electrical resistance.

7 Claims, 10 Drawing Sheets

| BRAND | MANUFACTURER'S NAME | TYPE | CATEGORY | BASIS WEIGHT | DENSITY | BLEED-THROUGH | TROUBLE |
|---|---|---|---|---|---|---|---|
| A | a | UNCOATED PAPER | HIGH-QUALITY PAPER | 81.4 | 0.954 | 0.05 | MARCH 15, 2020, WRINKLED PAPER, ... |
| B | b | UNCOATED PAPER | HIGH-QUALITY PAPER | 81.4 | 0.938 | 0.07 | MAY 20, 2020, PAPER JAM |
| C | c | UNCOATED PAPER | HIGH-QUALITY PAPER | 104.7 | 0.998 | 0.06 | OCTOBER 1, 2020, RUNNING INK |
| D | a | UNCOATED PAPER | HIGH-QUALITY PAPER | 81.4 | 0.982 | 0.07 | — |
| E | d | UNCOATED PAPER | HIGH-QUALITY PAPER | 81.4 | 0.98 | 0.06 | APRIL 2, 2020, POOR FIXING, ... |
| F | a | COATED PAPER | ROUGH PAPER | 83 | 1.571 | 0.03 | — |
| ... | ... | ... | ... | ... | ... | ... | ... |

FIG. 4

| BRAND | MANUFACTURER'S NAME | TYPE | CATEGORY | BASIS WEIGHT | DENSITY | BLEED-THROUGH | TROUBLE |
|---|---|---|---|---|---|---|---|
| A | a | UNCOATED PAPER | HIGH-QUALITY PAPER | 81.4 | 0.954 | 0.05 | MARCH 15, 2020, WRINKLED PAPER, ... |
| B | b | UNCOATED PAPER | HIGH-QUALITY PAPER | 81.4 | 0.938 | 0.07 | MAY 20, 2020, PAPER JAM |
| C | c | UNCOATED PAPER | HIGH-QUALITY PAPER | 104.7 | 0.998 | 0.06 | OCTOBER 1, 2020, RUNNING INK |
| D | a | UNCOATED PAPER | HIGH-QUALITY PAPER | 81.4 | 0.982 | 0.07 | — |
| E | d | UNCOATED PAPER | HIGH-QUALITY PAPER | 81.4 | 0.98 | 0.06 | APRIL 2, 2020, POOR FIXING, ... |
| F | a | COATED PAPER | ROUGH PAPER | 83 | 1.571 | 0.03 | — |
| ... | | ... | ... | ... | ... | ... | ... |

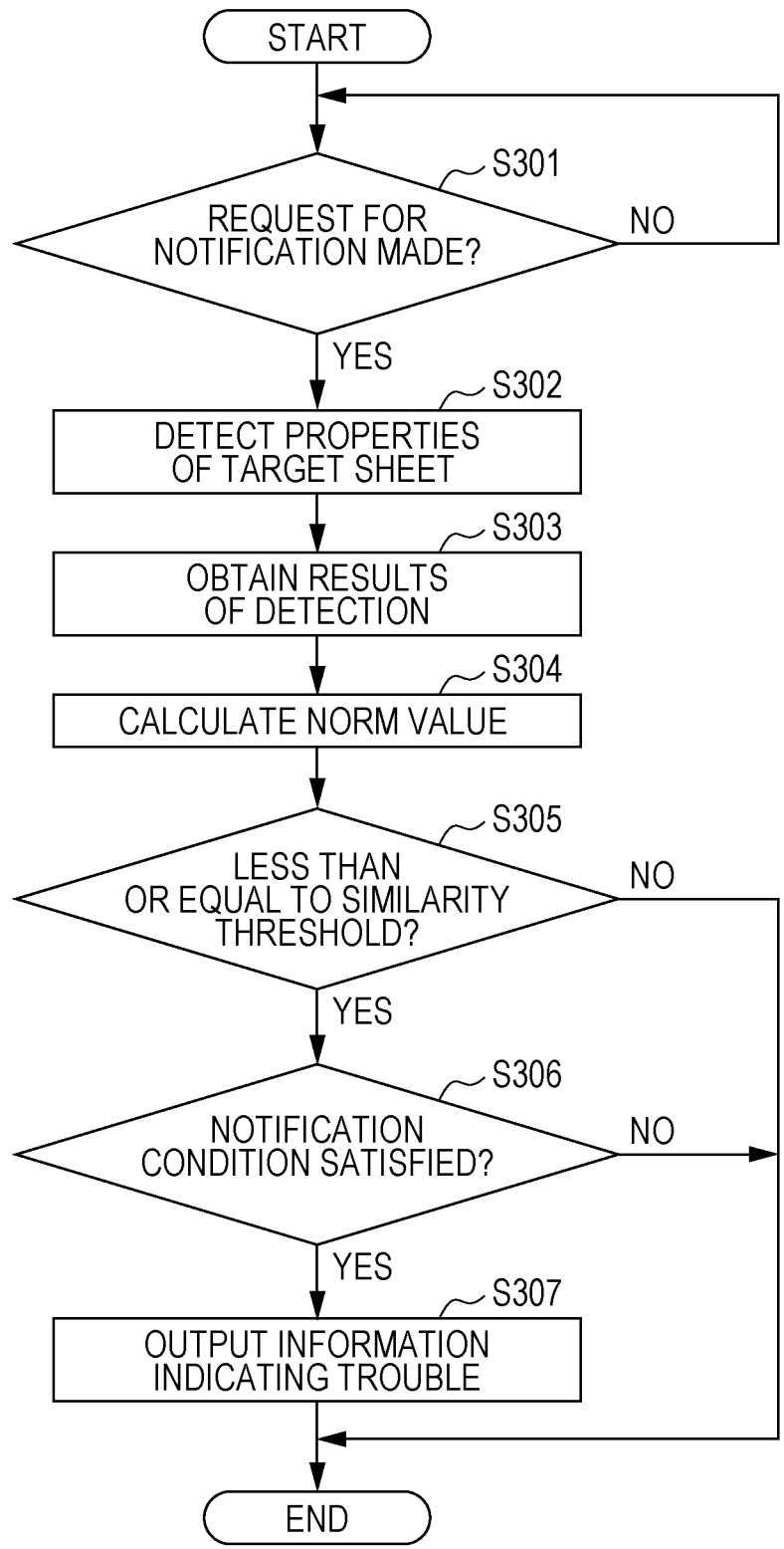

FIG. 8

The relationships between the target sheet and registered sheets are shown below.

| Ranking | Relationship | Norm value | Brand | Manufacturer's name | Type | Category | Basis weight | Density | Bleed-through |
|---|---|---|---|---|---|---|---|---|---|
| 1 | Same | 0.81 | E | d | Uncoated paper | High-quality paper | 81.4 | 0.98 | 0.06 |
| 2 | Similar | 1.14 | D | a | Uncoated paper | High-quality paper | 81.4 | 0.982 | 0.07 |
| 3 | Similar | 1.32 | B | b | Uncoated paper | High-quality paper | 81.4 | 0.938 | 0.07 |
| 4 | Similar | 1.5 | C | c | Uncoated paper | High-quality paper | 104.7 | 0.998 | 0.06 |
| 5 | Not similar | 1.98 | A | a | Uncoated paper | High-quality paper | 81.4 | 0.954 | 0.05 |
| 6 | Not similar | 2.34 | F | a | Coated paper | Rough paper | 83 | 1.571 | 0.03 |

Set printing condition

Check trouble record

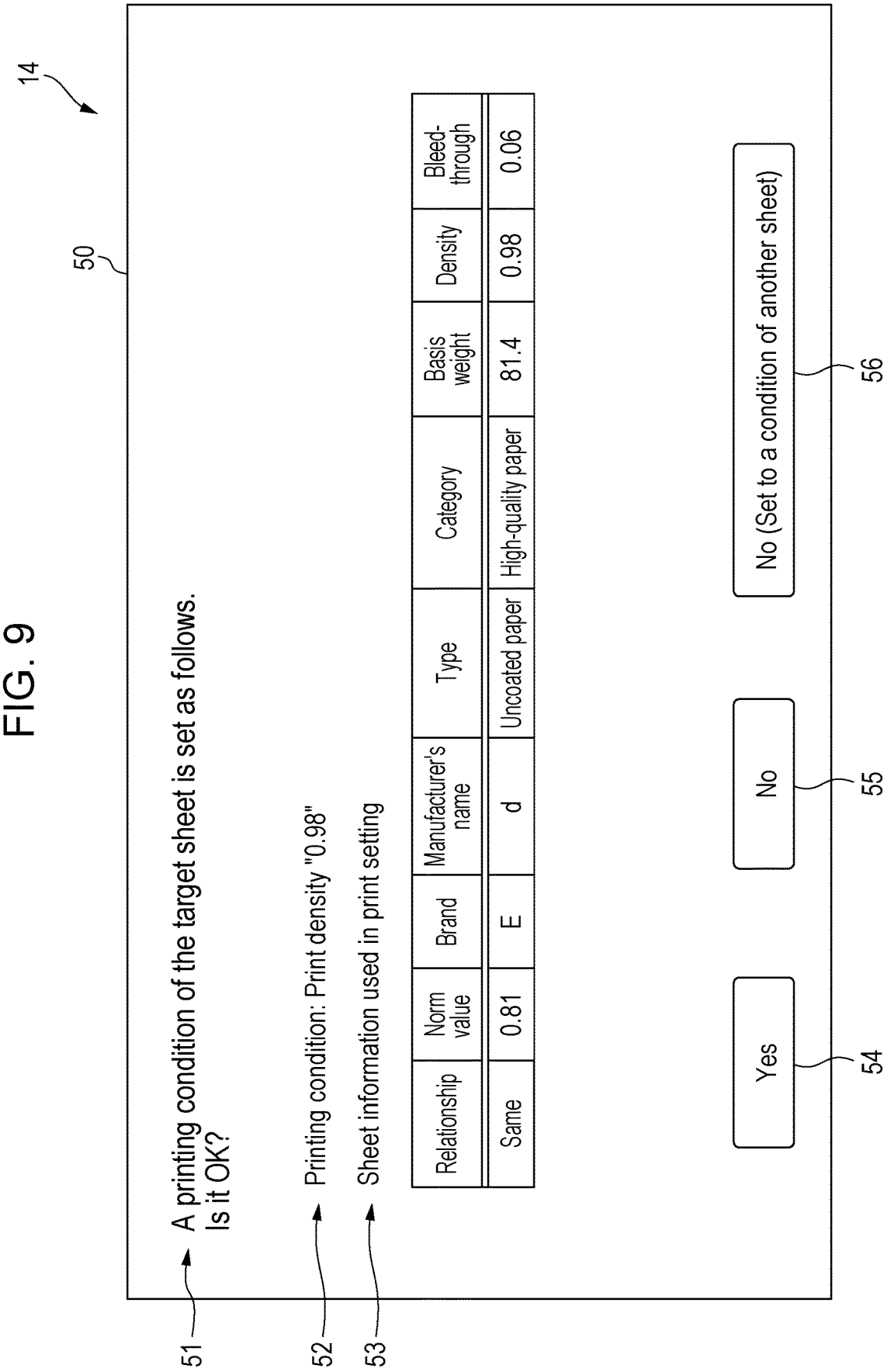

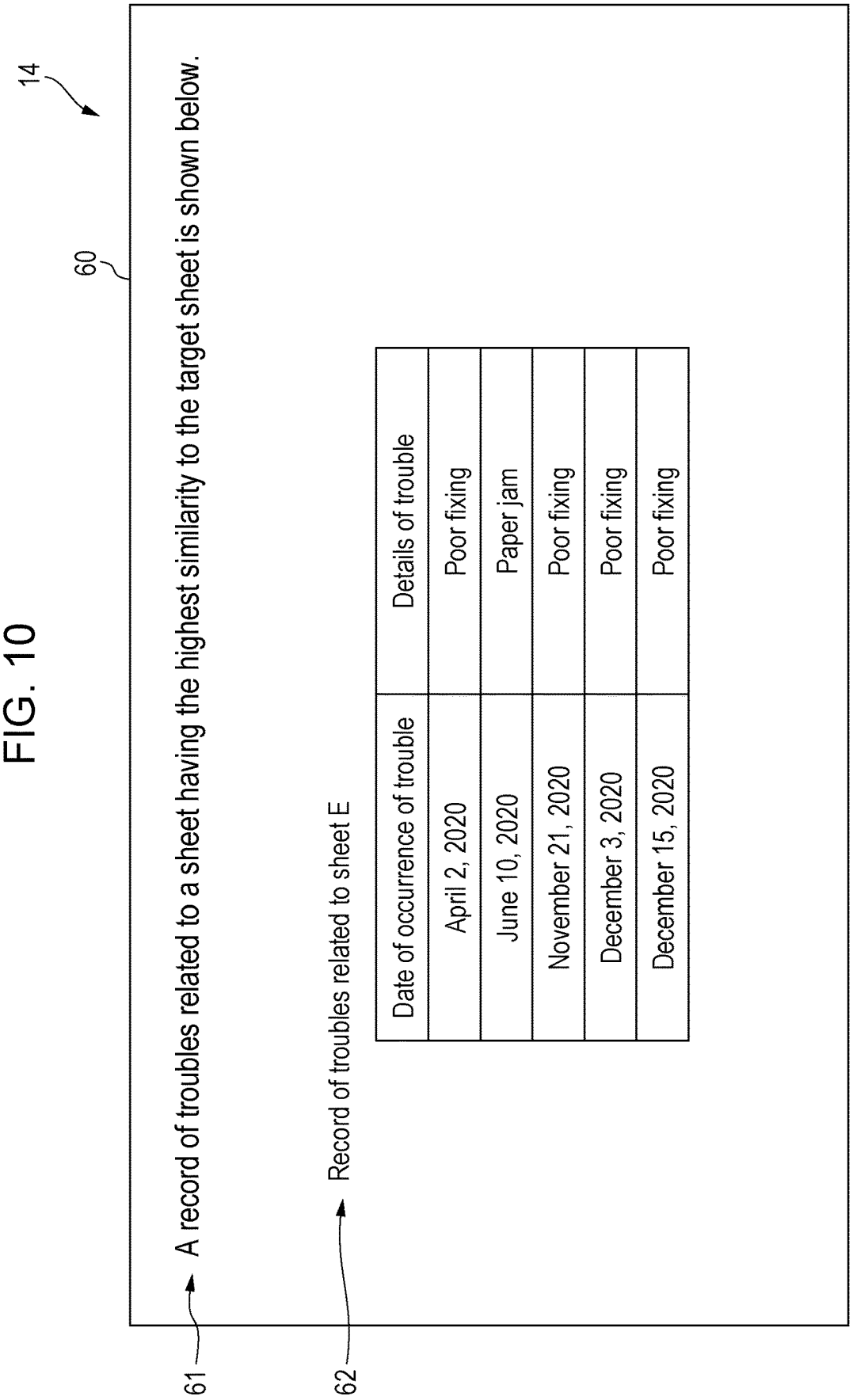

INFORMATION PROCESSING APPARATUS AND IMAGE FORMING SYSTEM

CROSS-REFERENCE TO RELATED APPLICATIONS

This application is based on and claims priority under 35 USC 119 from Japanese Patent Application No. 2020-217051 filed Dec. 25, 2020.

BACKGROUND (i) Technical Field

The present disclosure relates to an information processing apparatus and an image forming system.

(ii) Related Art

Japanese Unexamined Patent Application Publication No. 2020-101739 describes a technique in which when characteristics of a sheet are detected by a characteristics detector included in an image forming apparatus, one or more sheet brands having characteristics that are indicated by sheet information stored in a storage unit and that match the detected characteristics of the sheet are extracted.

Japanese Patent No. 5110793 describes a form identification apparatus including a recording unit that stores feature values of plural types of registered forms, a first check unit that extracts a feature value from an input form and checks the form against the registered forms, and a second check unit that checks the form, for which recognition fails in the first check, against the registered forms using the feature value.

Japanese Unexamined Patent Application Publication No. 2020-6628 describes an image forming apparatus including a measurement unit that measures physical properties of a medium on which an image is formed, an image forming operation unit that forms an image on the medium, a reading unit that reads the formed image, and a medium identification unit that identifies the type of the medium on the basis of the results of measurement by the measurement unit and the result of reading by the reading unit.

SUMMARY

A technique is available in which an image formed on a specific sheet is detected, and on the basis of the detected image, information about a sheet that satisfies a set condition regarding a relationship with the specific sheet, such as information about a sheet that is determined to be of the same type as the type of the specific sheet, is provided to a user. However, in this case, unless an image is formed on a specific form, it is not possible to provide a user with information about a sheet that satisfies a set condition regarding a relationship with the specific sheet.

Aspects of non-limiting embodiments of the present disclosure relate to a technique in which even in a case where an image is not formed on a specific form, information about a sheet that satisfies a set condition regarding a relationship with the specific sheet is provided to a user.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a sensor that detects a property of a specific sheet, and a processor configured to output information about a sheet that satisfies a set condition regarding a relationship with the property detected by the sensor, wherein the sensor includes at least an infrared sensor that detects the property by emitting an infrared ray to a sheet or an electric sensor that detects the property on the basis of an electrical resistance.

BRIEF DESCRIPTION OF THE DRAWINGS

An exemplary embodiment of the present disclosure will be described in detail based on the following figures, wherein:

FIG. 4 is a diagram illustrating a sheet management table;

FIG. 7 is a flowchart illustrating a flow of a trouble notification process;

FIG. 8 is a diagram illustrating an example of an identification screen;

FIG. 9 is a diagram illustrating an example of a setting screen; and

FIG. 10 is a diagram illustrating an example of a trouble notification screen.

DETAILED DESCRIPTION

Hereinafter, an exemplary embodiment of the present disclosure will be described in detail with reference to the attached drawings.

Figure 1:
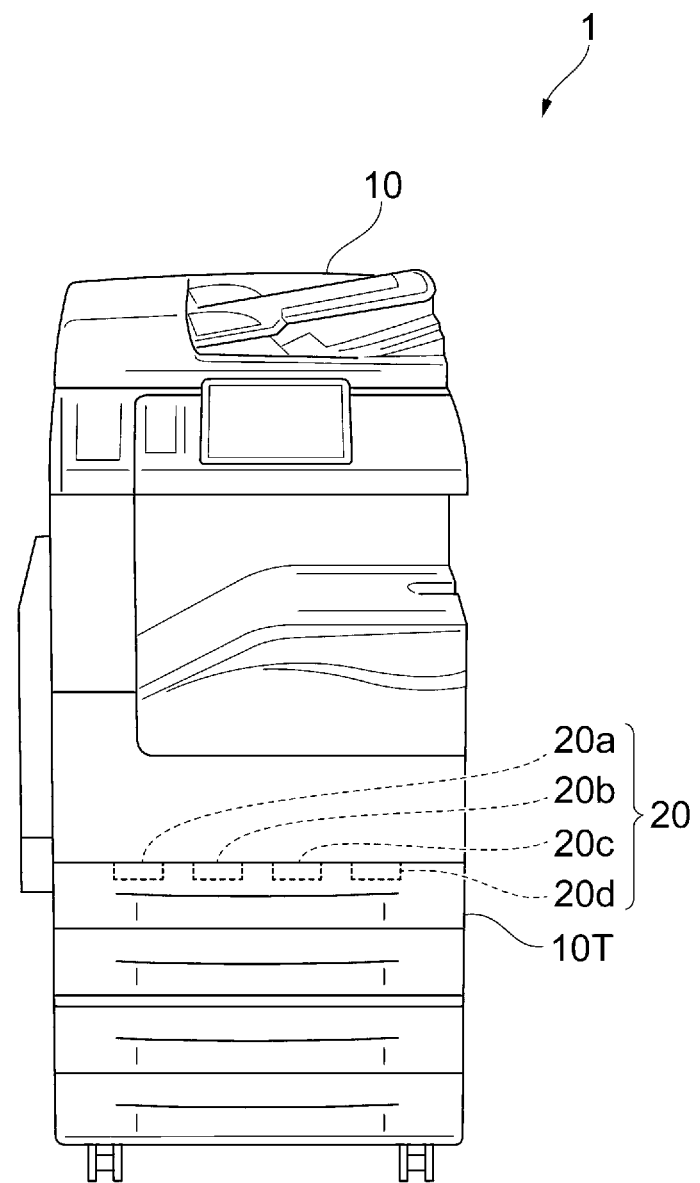
FIG. 1 is a diagram illustrating an example overall configuration of a relationship identification system according to an exemplary embodiment.

FIG. 1 is a diagram illustrating an example overall configuration of a relationship identification system 1 according to this exemplary embodiment. The relationship identification system 1 of this exemplary embodiment is a system that identifies a relationship between one sheet and another sheet different from the one sheet. Examples of the relationship between one sheet and another sheet include a relationship that the one sheet and the other sheet is of the same brand, a relationship that properties of the one sheet and the properties of the other sheet are similar to each other, and a relationship that properties of the one sheet and the properties of the other sheet are not similar to each other. The relationship that one sheet and another sheet is of the same brand is, in other words, a relationship that the properties of the one sheet and the properties of the other sheet are the same.

The relationship identification system 1, which is an example of the image forming system, includes an image forming apparatus 10 and sensors 20. The image forming apparatus 10 and the sensors 20 are connected to each other via a network.

The image forming apparatus 10 forms an image on a sheet. The image forming apparatus 10 may be an apparatus based on an electrophotographic system in which an image is formed by transferring a toner onto a sheet or may be an apparatus based on an ink-jet system in which an image is formed by shooting jets of ink onto a sheet. A target sheet on which an image is formed by the image forming apparatus 10 may be continuous paper formed of pages that are continuous in a sheet conveyance direction or may be a cut sheet.

Further, the image forming apparatus 10 is provided with an accommodation unit 10T that accommodates sheets.

The sensors 20 detect properties of a sheet. The relationship identification system 1 of this exemplary embodiment is provided with four sensors 20. More specifically, the relationship identification system 1 is provided with an infrared sensor 20a, an electric sensor 20b, a color sensor 20c, and a structure sensor 20d. In this exemplary embodiment, all of the infrared sensor 20a, the electric sensor 20b, the color sensor 20c, and the structure sensor 20d are fixed to the inside of the accommodation unit 10T of the image forming apparatus 10.

Note that the infrared sensor 20a, the electric sensor 20b, the color sensor 20c, and the structure sensor 20d may be simply referred to as the sensors 20 in a case where these sensors are described without distinguishing them from each other.

The infrared sensor 20a is a sensor that detects a property of a sheet by emitting infrared rays to the sheet. The infrared sensor 20a emits infrared rays to a sheet, receives infrared rays emitted via the sheet, and detects a property of the sheet from the received infrared rays. Examples of the infrared rays emitted via the sheet include infrared rays reflected by the sheet, infrared rays that pass through the sheet, and infrared rays radiated by the sheet absorbing infrared rays.

The infrared sensor 20a detects a chemical property of a sheet by emitting infrared rays to the sheet. Examples of the chemical property of a sheet include the water content of a sheet and materials contained in a sheet. The materials contained in a sheet may include an additive added to the sheet. Examples of the additive include a sizing agent, a loading material, a colorant, and an augmenting agent. The sizing agent is an additive used to suppress running of ink adhered to the sheet. The loading material is an additive used to fill in gaps between fibers of the sheet. The augmenting agent is an additive used to increase paper strength.

In a case where a sheet contains water or an additive and the water or the additive absorbs infrared rays, infrared rays are reflected from the sheet to a small degree by the absorbed infrared rays. Accordingly, the infrared sensor 20a of this exemplary embodiment detects the water content of the sheet, materials contained in the sheet, and the like from the infrared rays reflected from the sheet.

As the infrared sensor 20a, a near-infrared sensor may be used, a mid-infrared sensor may be used, or a far-infrared sensor may be used. Examples of the near-infrared sensor include an infrared sensor that receives an electromagnetic wave of a wavelength range of 780 nm or more and less than 2500 nm. Examples of the mid-infrared sensor include an infrared sensor that receives an electromagnetic wave of a wavelength range of 2500 nm (2.5 µm) or more and less than 25000 nm (25 µm). Examples of the far-infrared sensor include an infrared sensor that receives an electromagnetic wave of a wavelength range of 25 µm or more and 1000 µm or less.

In this exemplary embodiment, as the infrared sensor 20a, a near-infrared sensor is used.

The electric sensor 20b is a sensor that detects a property of a sheet on the basis of an electrical resistance. More specifically, the electric sensor 20b is provided with a deformable member. When the deformable member is displaced as a sheet coming into contact with the deformable member is displaced, the electric sensor 20b detects a property of the sheet from a change in the electrical resistance of the deformable member. Examples of the electric sensor 20b include a strain sensor that detects a strain and a pressure sensor that detects a pressure. Examples of the deformable member include a metal member and a semiconductor member.

The electric sensor 20b detects a physical property of a sheet on the basis of the electrical resistance. Examples of the physical property of a sheet include the stiffness of a sheet and a coating for a sheet. Examples of the coating for a sheet include whether a coating is applied to a sheet and the amount of coating applied to a sheet.

The degree of displacement of a sheet differs depending on the stiffness of the sheet and the coating for the sheet. Accordingly, the electric sensor 20b of this exemplary embodiment detects the stiffness of a sheet and a coating for a sheet on the basis of the electrical resistance.

The color sensor 20c is a sensor that detects a property regarding the color of a sheet. Examples of the property regarding the color of a sheet include the color of a sheet and the brightness of a sheet.

Examples of the color sensor 20c include an image sensor and an element that generates an electric current when receiving light. Examples of the element that generates an electric current when receiving light include a diode and a transistor. In this exemplary embodiment, as the color sensor 20c, a complementary metal-oxide semiconductor (CMOS) image sensor is used.

The structure sensor 20d is a sensor that detects the structure of a sheet. Examples of the structure of a sheet include the smoothness of the surface of a sheet, the amount of air between fibers in a sheet, the basis weight of a sheet, the thickness of a sheet, and the roughness of the surface of a sheet.

Examples of the structure sensor 20d include an image sensor. In this exemplary embodiment, as the structure sensor 20d, a CMOS sensor is used.

Note that the sensors 20 used in the relationship identification system 1 are not limited to the four sensors 20 described above.

For example, instead of the electric sensor 20b, an ultrasonic sensor may be used. An ultrasonic sensor is a sensor that detects a property of a sheet by emitting an ultrasonic wave to the sheet. The ultrasonic sensor emits an ultrasonic wave to a sheet, receives an acoustic wave reflected from the sheet, and detects a property of the sheet from the received acoustic wave.

The ultrasonic sensor detects a physical property of a sheet by emitting an ultrasonic wave to the sheet. Examples of the physical property of a sheet include the stiffness of a sheet and a coating for a sheet. The velocity at which an ultrasonic wave is propagated through a sheet differs depending on the stiffness of the sheet and a coating for the sheet. Accordingly, the ultrasonic sensor of this exemplary embodiment detects the stiffness of a sheet and a coating applied to the sheet on the basis of the time from when the ultrasonic sensor emits an ultrasonic wave to the sheet to when the ultrasonic sensor receives an acoustic wave reflected from the sheet.

The relationship identification system 1 may be provided with both the electric sensor 20b and the ultrasonic sensor.

In this exemplary embodiment, for each sheet brand, information about properties of the sheet is stored on the image forming apparatus 10. Note that a sheet for which information is stored on the image forming apparatus 10 may be hereinafter referred to as a registered sheet. When detecting properties of a specific sheet, the sensors 20 transmit the results of detection to the image forming apparatus 10. In this case, each of the sensors 20 provided in the relationship identification system 1 detects a property of the specific sheet and transmits the result of detection to the image forming apparatus 10. The image forming apparatus 10 compares the transmitted results of detection with the properties of a registered sheet to identify the relationship between the specific sheet for which properties are detected by the sensors 20 and the registered sheet. Further, the image forming apparatus 10 outputs information indicating the identified relationship.

Note that a sheet for which the relationship with a registered sheet is identified may be hereinafter referred to as a target sheet.

Configuration of Image Forming Apparatus

Figure 2:
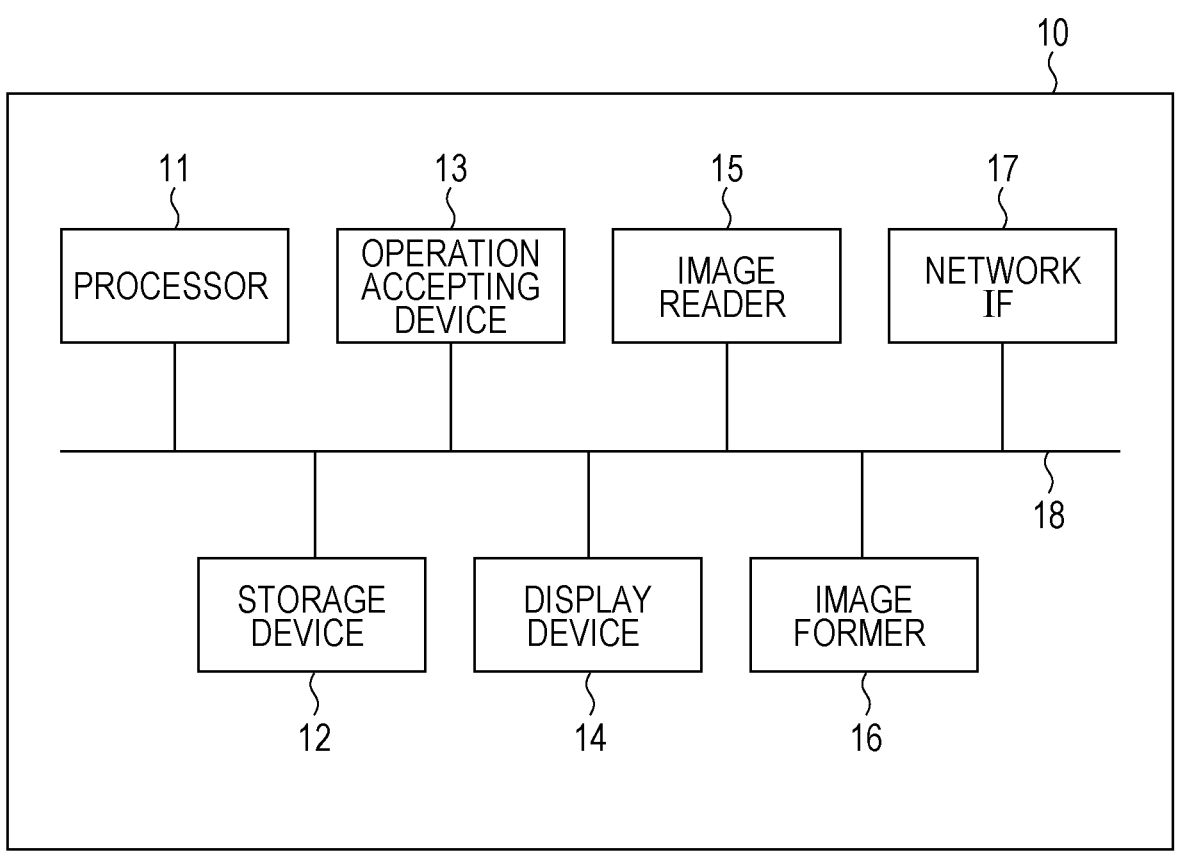
FIG. 2 is a diagram illustrating a hardware configuration of an image forming apparatus.

Now, a hardware configuration of the image forming apparatus 10 is described. FIG. 2 is a diagram illustrating a hardware configuration of the image forming apparatus 10.

The image forming apparatus 10 includes a processor 11 that executes a program to control operations of the image forming apparatus 10, a storage device 12 that stores the program executed by the processor 11 and various types of data, and an operation accepting device 13 that accepts a user operation. The image forming apparatus 10 further includes a display device 14 that displays an image, an image reader 15 that reads an image, an image former 16 that forms an image, and a network interface (IF) 17 that implements communication between the image forming apparatus 10 and the sensors 20. These are connected to each other via a signal line 18 including a data bus, an address bus, and a Peripheral Component Interconnect (PCI) bus.

The processor 11 is formed of, for example, a central processing unit (CPU). The processor 11 performs processes based on the program stored in the storage device 12 to implement various functions. The processor 11 and the sensors 20 are regarded as the information processing apparatus.

The storage device 12 is formed of, for example, a read-only memory (ROM) that stores a Basic Input Output System (BIOS) and the like, a random access memory (RAM) that is used as a work area, and a hard disk device that stores a basic program, an application program, and the like. Note that the ROM and the RAM may be included as part of the processor 11.

The operation accepting device 13 is formed of, for example, a keyboard, a mouse, mechanical buttons, and switches. As the operation accepting device 13, a touch sensor that forms a touch panel so as to be integrated with the display device 14 may be used.

The display device 14 is formed of a liquid crystal display or an organic electroluminescence (EL) display that is used to display information.

The image reader 15 reads an image recorded to a sheet. As the image reader 15, for example, a scanner is used. As the scanner, for example, a scanner based on a charge-coupled device (CCD) system is used in which reflected light resulting from light emitted from a light source to a document is condensed by a lens and received by a CCD. As the scanner, for example, a scanner based on a contact image sensor (CIS) system may be used in which reflected light rays resulting from light rays sequentially emitted from a light-emitting diode (LED) light source to a document are received by a CIS.

The image former 16 forms an image on a sheet. As the image former 16, for example, a printer is used.

Functional Configuration of Image Forming Apparatus

Figure 3:
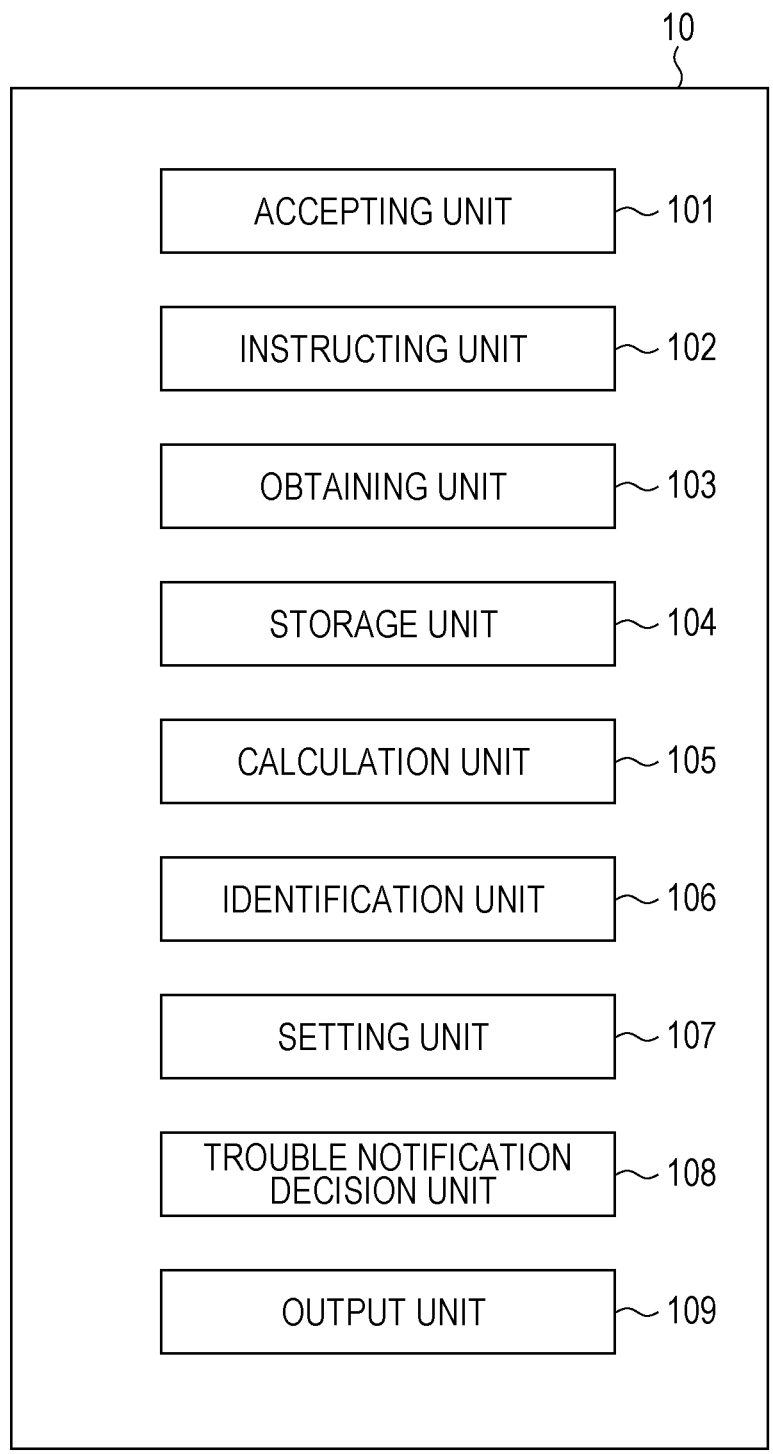
FIG. 3 is a block diagram illustrating an example functional configuration of the image forming apparatus.

Now, a functional configuration of the image forming apparatus 10 is described. FIG. 3 is a block diagram illustrating an example functional configuration of the image forming apparatus 10.

FIG. 3 illustrates some of the functions implemented by the processor 11 executing the application program.

The image forming apparatus 10 includes an accepting unit 101, an instructing unit 102, an obtaining unit 103, a storage unit 104, a calculation unit 105, an identification unit 106, a setting unit 107, a trouble notification decision unit 108, and an output unit 109.

The accepting unit 101 accepts a request from a user. Examples of the request from a user include a request for identifying the relationship between a target sheet and a registered sheet, a request for setting a condition for printing using a target sheet, and a request for sending a notification of a trouble with printing using a registered sheet related to a target sheet. When accepting a request from a user, the accepting unit 101 notifies the instructing unit 102 that the request has been made.

The instructing unit 102 instructs each of the sensors 20 provided in the relationship identification system 1 to detect properties of a target sheet. When notified by the accepting unit 101 that the request has been made by the user, the instructing unit 102 gives an instruction to each of the sensors 20.

The obtaining unit 103 obtains the results of detection of properties of the target sheet by the sensors 20 from the sensors 20 provided in the relationship identification system 1. In a case where one sensor 20 detects plural properties of the target sheet, the obtaining unit 103 obtains the result of detection for each of the properties that are detection targets.

The storage unit 104 stores information about a registered sheet, such as properties of the registered sheet. The content stored in the storage unit 104 will be described in detail below.

The calculation unit 105 calculates an indicator regarding relationships between properties of a target sheet and properties of a registered sheet.

The calculation unit 105 calculates the differences between the results of detection of properties of a target sheet by the sensors 20 and the properties, of a registered sheet, stored in the storage unit 104. In this exemplary embodiment, properties of a target sheet detected by the sensors 20 and the properties, of a registered sheet, stored in the storage unit 104 are determined as numerical values. Values determined for properties of a sheet may be values detected by the sensors 20 or values obtained as a result of processing by the calculation unit 105 on the basis of the values detected by the sensors 20. As the differences between the results of detection of properties of a target sheet by the sensors 20 and the properties, of a registered sheet, stored in the storage unit 104, the calculation unit 105 calculates a Euclidean distance. A Euclidean distance n is calculated by using equation (1) below.

$$n(p, q) = \sum_{i=1}^{n} \sqrt{a_i(p_i - q_i)^2} \quad (1)$$

In equation (1) above, p is a value determined for a property of a target sheet, and q is a value determined for the property of a registered sheet. Further, a is a coefficient set for each type of sheet property, and i is a number for identifying a type of sheet property. That is, the calculation unit 105 calculates, for each type of sheet property, the difference between the property of a target sheet and the property of a registered sheet and calculates the Euclidean distance n on the basis of the difference for each type of property. Specifically, in this exemplary embodiment, for each of the properties detected by the sensors 20 provided in the relationship identification system 1, the calculation unit 105 calculates the difference between the property of a target sheet and the property of a registered sheet and calculates the Euclidean distance n on the basis of the difference for each property.

After calculating the Euclidean distance n, the calculation unit 105 calculates a norm value, which is the length of the calculated Euclidean distance n. The calculation unit 105 calculates, for each registered sheet for which sheet properties are stored in the storage unit 104, the Euclidean distance n and the norm value regarding the relationship between the target sheet and the registered sheet.

From equation (1) above, as the difference between a value determined for a property of a target sheet and a value determined for the property of a registered sheet is larger, the Euclidean distance n and the norm value become larger. In other words, as the difference between a property of a target sheet and the property of a registered sheet is lager, the Euclidean distance n and the norm value become larger.

The calculation unit 105 stores the calculated norm value in the storage unit 104 in association with the target sheet and the registered sheet that are targets of the norm value.

The identification unit 106 identifies the relationship between a target sheet and a registered sheet. More specifically, the identification unit 106 identifies from the norm value calculated by the calculation unit 105 the relationship between a target sheet and a registered sheet.

The identification unit 106 of this exemplary embodiment identifies the relationship between a target sheet and a registered sheet using a sameness threshold and a similarity threshold.

The sameness threshold is a threshold used to determine that the properties of a target sheet and the properties of a registered sheet are the same. The sameness threshold is set as a threshold based on which it is determined that the properties of a target sheet and the properties of a registered sheet are the same. In this exemplary embodiment, in a case where the norm value calculated by the calculation unit 105 is less than or equal to the sameness threshold, the identification unit 106 determines that the target sheet and the registered sheet with which the norm value is associated have the same properties.

The similarity threshold is a threshold used to determine that the properties of a target sheet and the properties of a registered sheet are similar to each other. The similarity threshold is set as a threshold based on which it is determined that the properties of a target sheet and the properties of a registered sheet are similar to each other. The similarity threshold has a value larger than the value of the sameness threshold. In this exemplary embodiment, in a case where the norm value calculated by the calculation unit 105 is greater than the sameness threshold and less than or equal to the similarity threshold, the identification unit 106 determines that the target sheet and the registered sheet with which the norm value is associated have similar properties. In a case where the norm value is greater than the similarity threshold, the identification unit 106 determines that the target sheet and the registered sheet with which the norm value is associated does not have similar properties.

The identification unit 106 identifies, for each registered sheet, the relationship between a target sheet and the registered sheet. The identification unit 106 stores the identified relationship in the storage unit 104 in association with the target sheet and the registered sheet that are targets of the relationship.

The setting unit 107 sets a condition for printing using a target sheet. Examples of the condition for printing include the density of an image formed on the target sheet.

When notified by the accepting unit 101 that a request for setting a condition for printing using a target sheet has been made, the setting unit 107 sets a printing condition. More specifically, the setting unit 107 sets as a condition for printing using the target sheet, a printing condition that is set for a registered sheet with which the smallest norm value is associated among registered sheets for which information is stored in the storage unit 104.

The trouble notification decision unit 108 decides to send a notification of a trouble that has occurred in printing using a registered sheet.

When notified by the accepting unit 101 that a request for sending a notification of a trouble with printing using a registered sheet related to a target sheet has been made, the trouble notification decision unit 108 decides to send a trouble notification. More specifically, the trouble notification decision unit 108 decides to send a notification of a trouble that has occurred in printing using a registered sheet with which the smallest norm value is associated among registered sheets for which information is stored in the storage unit 104.

The output unit 109 outputs information. More specifically, the output unit 109 outputs to the display device 14 of the image forming apparatus 10 information, such as the result of identification by the identification unit 106, the condition set by the setting unit 107, and the content of the notification that the trouble notification decision unit 108 has decided to send.

Content Stored in Storage Unit

Now, the content of information stored in the storage unit 104 is described.

FIG. 4 is a diagram illustrating a sheet management table. The sheet management table is a table for managing registered sheets. The sheet management table is stored in the storage unit 104.

The sheet management table shows, as "brand", the brand of each registered sheet.

The sheet management table shows, as "manufacturer's name", the name of the manufacturer of each registered sheet.

The sheet management table shows, as "type", the type of each registered sheet.

The sheet management table shows, as "category", the category of each registered sheet obtained by subdividing the "type" of the registered sheet.

The sheet management table shows, as "basis weight", the basis weight of each registered sheet.

The sheet management table shows, as "density", the density of an image formed on each registered sheet. The "density" is the density of an image that is a printing condition set for printing using the registered sheet.

The sheet management table shows, as "bleed-through" when an image has been formed on each registered sheet, the density of an image appearing as a result of seepage from a side of the registered sheet on which the image is formed to the opposite side thereof. The "bleed-through" is a result obtained from printing for which the "density" is set as a condition.

The sheet management table shows, as "trouble", information about a trouble that has occurred in printing using each registered sheet.

An example of "trouble" is described. For a registered sheet "A", as "trouble", "Mar. 15, 2020, wrinkled paper" is indicated. This means that when printing using the registered sheet "A" was performed on Mar. 15, 2020, a trouble occurred in which the registered sheet "A" was wrinkled.

The administrator of the relationship identification system 1 inputs, for each registered sheet, "brand", "manufacturer's name", "type", "category", "basis weight", "density", "bleed-through", and "trouble" into the sheet management table. In a case where a trouble with printing has occurred plural times for one registered sheet, information about each trouble is input as "trouble" of the target.

Although not illustrated, in the sheet management table, as sheet properties, information about the other properties different from "type", "category", and "basis weight" is stored. Specifically, in this exemplary embodiment, in the sheet management table, information about properties detected by the sensors 20 provided in the relationship identification system 1 is stored for each registered sheet.

Relationship Identification Process

Now, a relationship identification process is described. The relationship identification process is a process for identifying the relationship between a target sheet and a registered sheet. The relationship identification process is performed by the relationship identification system 1.

Figure 5:
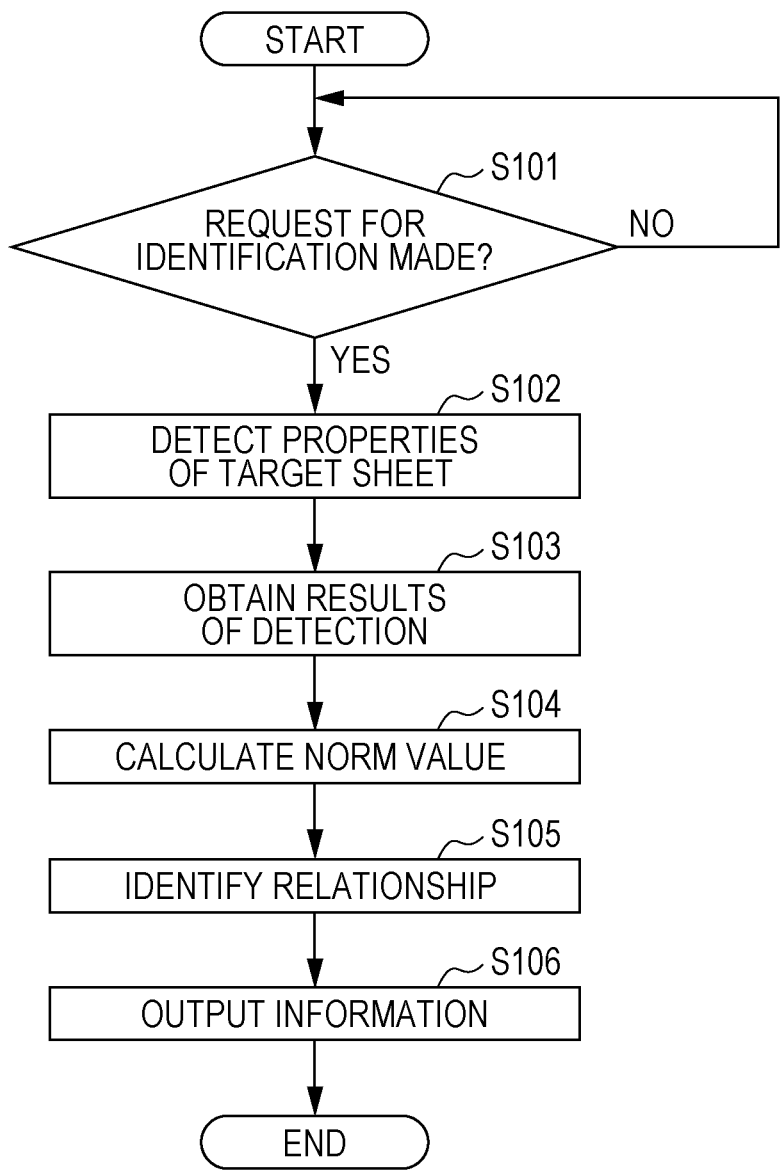
FIG. 5 is a flowchart illustrating a flow of a relationship identification process.

FIG. 5 is a flowchart illustrating a flow of the relationship identification process.

The accepting unit 101 determines whether a request for identifying the relationship between a target sheet and a registered sheet has been made by a user (step (hereinafter sometimes simply referred to as "S") 101). For example, the accepting unit 101 performs the above-described determination in accordance with whether an operation for making a request for identifying the relationship between a target sheet and a registered sheet has been performed via the operation accepting device 13. During a period in which a negative result is successively obtained, the accepting unit 101 repeats the determination in step 101.

In a case where a request for identifying the relationship has been made (Yes in S101), the flow proceeds to the next step.

The sensors 20 provided in the relationship identification system 1 detect properties of the target sheet in response to an instruction given by the instructing unit 102 (S102). In this exemplary embodiment, the sensors 20 detect properties of sheets accommodated in the accommodation unit 10T of the image forming apparatus 10 as properties of the target sheet. After detecting properties of the target sheet, the sensors 20 transmit the results of detection to the obtaining unit 103.

The obtaining unit 103 obtains the results of detection transmitted from the sensors 20 (S103).

The calculation unit 105 calculates the Euclidean distance n and the norm value for the target sheet and a registered sheet from the properties of the target sheet detected by the sensors 20 and the properties, of the registered sheet, stored in the storage unit 104 (S104). The calculation unit 105 calculates the Euclidean distance n and the norm value for each registered sheet for which information is stored in the storage unit 104.

The identification unit 106 identifies the relationship between the target sheet and a registered sheet from the results of calculation by the calculation unit 105 (S105). More specifically, the identification unit 106 identifies the relationship between the target sheet and a registered sheet as a relationship that the properties of the target sheet and the properties of the registered sheet are the same, a relationship that the properties of the target sheet and the properties of the registered sheet are similar to each other, or a relationship that the properties of the target sheet and the properties of the registered sheet are not similar to each other. The identification unit 106 identifies, for each registered sheet, the relationship between the target sheet and the registered sheet.

The output unit 109 outputs, for example, information about the result of identification by the identification unit 106 to the display device 14 of the image forming apparatus 10 (S106). More specifically, the output unit 109 outputs to the display device 14 information indicating the relationship identified by the identification unit 106 and information, stored in the storage unit 104, about a registered sheet for which the relationship with the target sheet has been identified.

Note that the relationship identification system 1 of this exemplary embodiment identifies the relationship between the target sheet and a registered sheet from the results of detection of properties of the target sheet by the plural sensors 20; however, the relationship identification system 1 of this exemplary embodiment is not limited to this.

In the relationship identification system 1, at least one sensor 20 among the sensors 20 described above needs to be provided. The relationship identification system 1 needs to identify the relationship between a target sheet and a registered sheet from a property of the target sheet detected by the at least one sensor 20 provided in the relationship identification system 1 and the property of the registered sheet.

Further, the relationship identification system 1 is provided with the color sensor 20c and the structure sensor 20d; however, the relationship identification system 1 is not limited to this. One sensor 20 may detect the color of a sheet and also detect the structure of the sheet.

Setting Process

Next, a setting process is described. The setting process is a process for setting a condition for printing using a target sheet. The setting process is performed by the relationship identification system 1.

Figure 6:
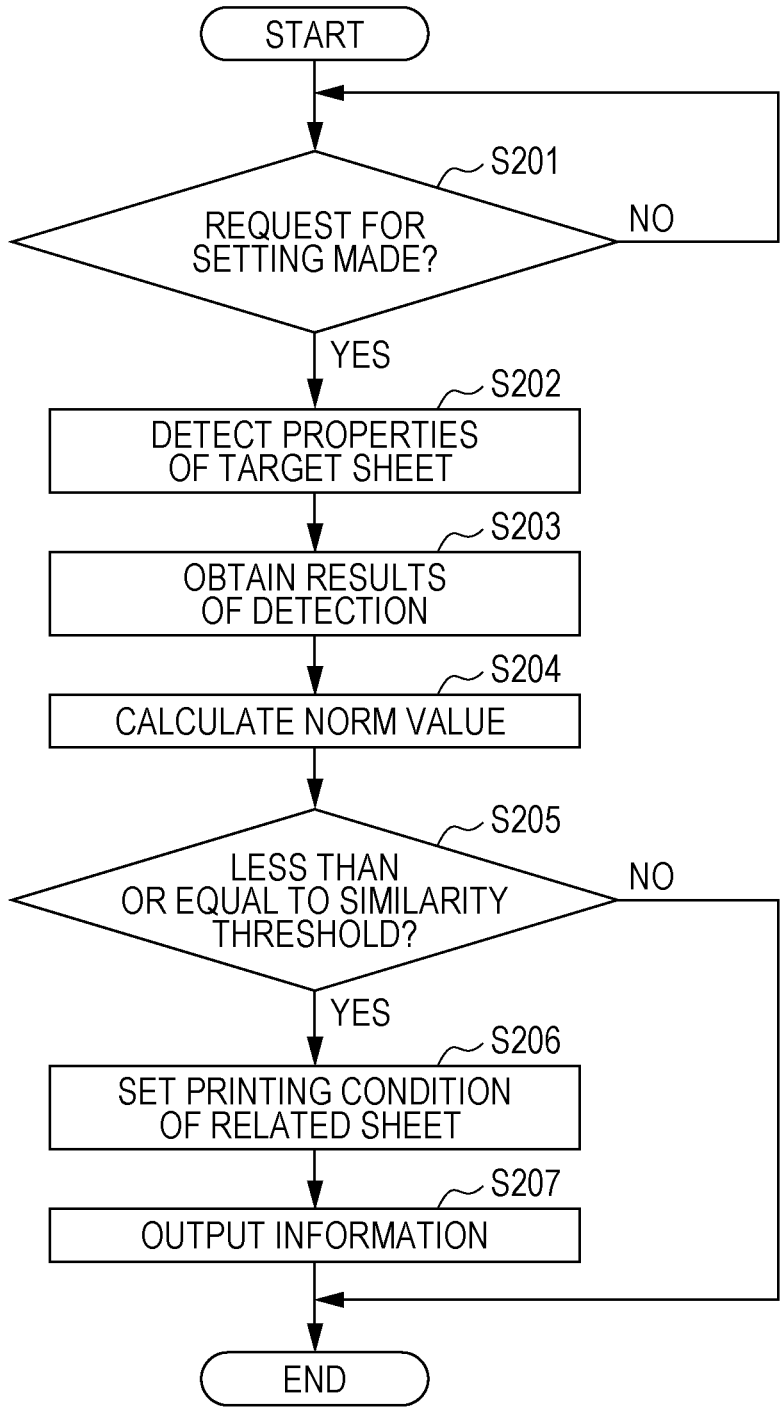
FIG. 6 is a flowchart illustrating a flow of a setting process.

FIG. 6 is a flowchart illustrating a flow of the setting process.

The accepting unit 101 determines whether a request for setting a condition for printing using a target sheet has been made by a user (S201). For example, the accepting unit 101 performs the above-described determination in accordance with whether an operation for making a request for setting a printing condition has been performed via the operation accepting device 13. During a period in which a negative result is successively obtained, the accepting unit 101 repeats the determination in step 201.

In a case where a request for setting a condition has been made (Yes in S201), the flow proceeds to the next step.

From step 202 to step 204, processes the same as the processes from step 102 to step 104 in the relationship identification process (see FIG. 5) are performed. In a case where the relationship identification process has been performed before the setting process, the norm value for each registered sheet has been calculated by the calculation unit 105. In this case, the processes from step 202 to step 204 may be omitted.

The setting unit 107 determines whether a registered sheet with which a norm value, among norm values for respective registered sheets, less than or equal to the similarity threshold is associated is present (S205). In a case where a registered sheet with which a norm value less than or equal to the similarity threshold is associated is not present (NO in S205), the setting process ends.

On the other hand, in a case where a registered sheet with which a norm value less than or equal to the similarity threshold is associated is present (YES in S205), the setting unit 107 extracts a registered sheet with which the smallest norm value is associated. Note that the registered sheet with which the smallest norm value is associated may be hereinafter referred to as a related sheet. The setting unit 107 sets a printing condition that has been set for the related sheet as a condition for printing using the target sheet (S206). More specifically, the setting unit 107 sets as a condition for printing using the target sheet, a condition stored in the storage unit 104 as a condition for printing using the related sheet.

The output unit 109 outputs information indicating the condition set by the setting unit 107 to the display device 14 of the image forming apparatus 10 (S207).

Trouble Notification Process

Now, a trouble notification process is described. The trouble notification process is a process for sending a notification of a trouble that has occurred in printing using a registered sheet. The trouble notification process is performed by the relationship identification system 1.

FIG. 7 is a flowchart illustrating a flow of the trouble notification process.

The accepting unit 101 determines whether a request for sending a notification of a trouble that has occurred in printing using a registered sheet related to the target sheet has been made by a user (S301). For example, the accepting unit 101 performs the above-described determination in accordance with whether an operation for making a request for sending a trouble notification has been performed via the operation accepting device 13. During a period in which a negative result is successively obtained, the accepting unit 101 repeats the determination in step 301.

In a case where a request for sending a trouble notification has been made (YES in S301), the flow proceeds to the next step.

From step 302 to step 304, processes the same as the processes from step 102 to step 104 in the relationship identification process (see FIG. 5) are performed. In a case where the relationship identification process has been performed before the trouble notification process, the norm value for each registered sheet has been calculated by the calculation unit 105. In this case, the processes from step 302 to step 304 may be omitted.

The trouble notification decision unit 108 determines whether a registered sheet with which a norm value, among norm values for respective registered sheets, less than or equal to the similarity threshold is associated is present (S305). In a case where a registered sheet with which a norm value less than or equal to the similarity threshold is associated is not present (NO in S305), the trouble notification process ends.

On the other hand, in a case where a registered sheet with which a norm value less than or equal to the similarity threshold is associated is present (YES in S305), the trouble notification decision unit 108 extracts a related sheet. Further, the trouble notification decision unit 108 determines whether the related sheet satisfies a notification condition (S306). The notification condition is a condition set for determining whether a notification of a trouble that has occurred in printing is to be sent. The notification condition is set from the viewpoint of determining whether the occurrence of a trouble is caused by the registered sheet. Further, in this exemplary embodiment, as the notification condition, a condition that a trouble with printing has occurred a predetermined number of times or more in the last one year is set. The predetermined number of times may be any number of times and is, for example, three. The trouble notification decision unit 108 refers to "trouble" of the related sheet in the sheet management table (see FIG. 4) to determine whether the related sheet satisfies the notification condition.

In a case where the related sheet does not satisfy the notification condition (NO in S306), the trouble notification process ends. In this case, a notification of a trouble that has occurred in printing is not sent.

In a case where the related sheet satisfies the notification condition (YES in S306), the trouble notification decision unit 108 decides to send a notification of a trouble that has occurred in printing using the related sheet. In this case, the output unit 109 outputs information indicating a trouble that has occurred in printing using the related sheet to the display device 14 of the image forming apparatus 10 (S307).

Example Output of Information

Now, examples of information output to the display device 14 of the image forming apparatus 10 are described.

FIG. 8 is a diagram illustrating an example of an identification screen 40. The identification screen 40 is a screen showing the results of identification by the identification unit 106 regarding relationships between a target sheet and registered sheets. In this exemplary embodiment, after the relationship identification process (see FIG. 5), the identification screen 40 is displayed on the display device 14.

The identification screen 40 includes an identification screen description part 41, an information display part 42, a setting request part 43, and a notification request part 44.

In the identification screen description part 41, information describing the identification screen 40 is displayed. In the illustrated example, in the identification screen description part 41, text "The relationships between the target sheet and registered sheets are shown below" stating that the relationships between the target sheet and registered sheets are displayed on the identification screen 40 is displayed.

In the information display part 42, information about registered sheets is displayed. In the information display part 42 of this exemplary embodiment, "ranking", "relationship", "norm value", "brand", "manufacturer's name", "type", "category", "basis weight", "density", and "bleed-through" are displayed for each registered sheet.

As "ranking", rankings set in ascending order of "norm value" are displayed.

As "relationship", the relationship between the target sheet and each registered sheet identified by the identification unit 106 is displayed. "Same" that is displayed as "relationship" means that the identification unit 106 determines that the properties of the target sheet and the properties of the registered sheet are the same. "Similar" that is displayed as "relationship" means that the identification unit 106 determines that the properties of the target sheet and the properties of the registered sheet are similar to each other. "Not similar" that is displayed as "relationship" means that the identification unit 106 determines that the properties of the target sheet and the properties of the registered sheet are not similar to each other.

As "norm value", the norm value calculated by the calculation unit 105 regarding the relationship between the target sheet and each registered sheet is displayed.

As "brand", "manufacturer's name", "type", "category", "basis weight", "density", and "bleed-through", "brand", "manufacturer's name", "type", "category", "basis weight", "density", and "bleed-through" stored in the sheet management table (see FIG. 4) are displayed.

Note that information displayed in the information display part 42 is not limited to the illustrated example. In the information display part 42, information, stored in the storage unit 104, about target properties detected by the relationship identification system 1 may be displayed for each registered sheet.

When a user selects the setting request part 43, the setting process (see FIG. 6) by the relationship identification system 1 is performed. After the setting process, a setting screen 50 is displayed on the display device 14 of the image forming apparatus 10 as illustrated in FIG. 9. The setting screen 50 is a screen showing a printing condition that is set for the target sheet.

The setting screen 50 includes a setting screen description part 51, a condition display part 52, an adopted-sheet display part 53, an acknowledge part 54, a reject part 55, and a change part 56.

In the setting screen description part 51, information describing the setting screen 50 is displayed. In the illustrated example, in the setting screen description part 51, text "A printing condition of the target sheet is set as follows. Is it OK?" stating that a condition for printing using the target sheet is set as displayed on the setting screen 50 is displayed.

In the condition display part 52, a printing condition set for the target sheet is displayed. The content displayed in the condition display part 52 is the condition set by the setting unit 107 in the setting process (see FIG. 6). In the illustrated example, in the condition display part 52, text "Printing condition: Print density "0.98"" is displayed.

In the adopted-sheet display part 53, information about a registered sheet is displayed. The target registered sheet for which information is displayed in the adopted-sheet display part 53 is a registered sheet for which a condition adopted as the condition for printing using the target sheet has been set. In this exemplary embodiment, information about the related sheet is displayed in the adopted-sheet display part 53. In the adopted-sheet display part 53, "relationship", "norm value", "brand", "manufacturer's name", "type", "category", "basis weight", "density", and "bleed-through" of the related sheet in the information displayed in the information display part 42 of the identification screen 40 (see FIG. 8) are displayed.

When a user selects the acknowledge part 54, the condition displayed in the condition display part 52 is acknowledged as the condition for printing using the target sheet.

When a user selects the reject part 55, setting of the condition for printing using the target sheet is canceled.

When a user selects the change part 56, the target registered sheet that is adopted in relation to the condition for printing using the target sheet is changed. Although not illustrated, in a case where the change part 56 is selected, for example, a screen that allows selection of any of the registered sheets for which information is stored in the storage unit 104 may be displayed on the display device 14. When a user selects a registered sheet, a condition that has been set for printing using the selected registered sheet may be set as the condition for printing using the target sheet.

When a user selects the notification request part 44 on the identification screen 40 (see FIG. 8), the trouble notification process by the relationship identification system 1 is performed. After the trouble notification process, a trouble notification screen 60 is displayed on the display device 14 of the image forming apparatus 10 as illustrated in FIG. 10. The trouble notification screen 60 is a screen for notifying a user of a trouble that has occurred in printing using a registered sheet related to the target sheet.

The trouble notification screen 60 includes a trouble description part 61 and a trouble display part 62.

In the trouble description part 61, information describing the trouble notification screen 60 is displayed. In the illustrated example, in the trouble description part 61, text "A record of troubles related to a sheet having the highest similarity to the target sheet is shown below" stating that information about troubles related to a registered sheet is displayed on the trouble notification screen 60 is displayed.

In the trouble display part 62, the details of troubles that have occurred in printing using the registered sheet are displayed. The target registered sheet for which the details of troubles are displayed in the trouble display part 62 is a registered sheet for which sending of a trouble notification is decided by the trouble notification decision unit 108 in the trouble notification process (see FIG. 7). In this exemplary embodiment, in the trouble display part 62, the details of troubles that have occurred in printing using the related sheet are displayed. As "date of occurrence of trouble" in the trouble display part 62, the date on which each trouble occurred in printing using the related sheet is displayed. As "details of trouble" in the trouble display part 62, the details of each trouble that occurred in printing using the related sheet are displayed.

In a case where the related sheet does not satisfy the notification condition (NO in S306 in FIG. 7) and a trouble notification is not sent accordingly, the output unit 109 may output to the display device 14 information indicating that a trouble notification is not sent and information indicating the reason for not sending a trouble notification. For example, the output unit 109 may display on the display device 14 text such as "A trouble notification is not sent because the frequency of the occurrences of troubles is low for a sheet having the highest similarity" stating that a trouble notification is not sent and also stating the reason for not sending a trouble notification.

As described above, in this exemplary embodiment, the sensors 20 detect properties of a target sheet. The processor 11 outputs information about a registered sheet that satisfies a set condition regarding the relationships with the properties detected by the sensors 20. The sensors 20 at least include the infrared sensor 20a that detects a property by emitting infrared rays to a sheet or the electric sensor 20b that detects a property on the basis of the electrical resistance.

Examples of the sheet that satisfies a set condition regarding the relationships with the properties detected by the sensors 20 include a registered sheet for which the Euclidean distance n and the norm value are calculated for the relationship with the target sheet. Examples of the information about the registered sheet include information, such as "ranking", "relationship", "norm value", "brand", "manufacturer's name", "type", "category", "basis weight", "density", and "bleed-through", about the registered sheet displayed in the information display part 42 of the identification screen 40. Examples of the information about the registered sheet include information, such as a printing condition set for the registered sheet displayed in the condition display part 52 of the setting screen 50. Examples of the information about the registered sheet further include information about a trouble that has occurred in printing using the registered sheet, displayed in the trouble display part 62 of the trouble notification screen 60. That is, the information about the registered sheet may be any information as long as the information is stored in the storage unit 104 as information about the registered sheet.

Note that the registered sheet that satisfies the set condition regarding the relationships with the properties detected by the sensors 20 is not limited to the example described above.

For example, the registered sheet that satisfies the set condition regarding the relationships with the properties detected by the sensors 20 may be a registered sheet with which a norm value less than or equal to a predetermined value is associated among registered sheets for which information is stored in the storage unit 104. The registered sheet that satisfies the set condition regarding the relationships with the properties detected by the sensors 20 may be a registered sheet having a ranking that is within a predetermined range from the top ranking for which the norm value is smallest among registered sheets for which information is stored in the storage unit 104. The set condition regarding the relationships with the properties detected by the sensors 20 may be determined on the basis of the Euclidean distance n calculated by the calculation unit 105. That is, the registered sheet that satisfies the set condition regarding the relationships with the properties detected by the sensors 20 may be a registered sheet that satisfies a condition based on an indicator calculated by the calculation unit 105 regarding the relationships between the properties of the target sheet and the properties of the registered sheet. Note that the registered sheet that satisfies the condition based on the indicator calculated by the calculation unit 105 may include a registered sheet for which the Euclidean distance n and the norm value are calculated regarding the relationship with the target sheet.

The calculation unit 105 may calculate not only the indicator based on the differences between the properties of the target sheet and the properties of a registered sheet but also an indicator regarding matching of the properties of the target sheet with the properties of a registered sheet. A registered sheet that satisfies a condition based on this calculated indicator may be assumed to be the registered sheet that satisfies the set condition regarding the relationships with the properties detected by the sensors 20. The registered sheet that satisfies the condition based on the indicator regarding matching of the properties of the target sheet with the properties of a registered sheet may be, for example, a registered sheet for which the indicator regarding matching of the properties of the target sheet with the properties of the registered sheet is calculated. The registered sheet that satisfies the condition based on the indicator regarding matching of the properties of the target sheet with the properties of a registered sheet may be, for example, a registered sheet for which the indicator regarding matching of the properties of the target sheet with the properties of the registered sheet falls within a predetermined numerical value range.

In this exemplary embodiment, the sensors 20 include an ultrasonic sensor that detects a property by emitting an ultrasonic wave to a sheet or the electric sensor 20b, and the infrared sensor 20a. The processor 11 outputs information about a registered sheet that satisfies a condition regarding the relationships with the property detected by the ultrasonic sensor or by the electric sensor 20b and a property detected by the infrared sensor 20a.

Specifically, in this exemplary embodiment, the ultrasonic sensor or the electric sensor 20b detects a physical property of a sheet. The infrared sensor 20a detects a chemical property of a sheet.

In this exemplary embodiment, the sensors 20 further include the color sensor 20c that detects the color of a sheet or the brightness of a sheet. The processor 11 outputs information about a registered sheet that satisfies a condition regarding the relationships with the property detected by the infrared sensor 20a or by the electric sensor 20b and the color or brightness detected by the color sensor 20c.

In this exemplary embodiment, the calculation unit 105 calculates the norm value on the basis of the differences between the properties of a target sheet and the properties of a registered sheet. In this exemplary embodiment, as described above, information about a registered sheet that satisfies a set condition regarding the calculated norm value is output. That is, information that is output by the output unit 109 as the information about the registered sheet is information based on the differences between the properties detected by the sensors 20 and the properties of the registered sheet that satisfies the condition.

Specifically, in this exemplary embodiment, the information based on the differences is information based on the difference between a value determined for a property detected by each sensor 20 and a value determined for the property of a registered sheet that satisfies the set condition regarding the relationship with the property detected by the sensor 20.

Note that this exemplary embodiment states that the information based on the difference between a value determined for a property detected by each sensor 20 and a value determined for the property of a registered sheet that satisfies the set condition regarding the relationship with the property detected by the sensor 20 is the Euclidean distance n or the norm value; however, this exemplary embodiment is not limited to this.

The calculation unit 105 may calculate a subtraction value obtained by subtracting a value determined for a property of a registered sheet from a value determined for the property of a target sheet. The identification unit 106 may compare the subtraction value calculated by the calculation unit 105 with the sameness threshold or the similarity threshold to identify the relationship between the target sheet and the registered sheet. Further, the output unit 109 may output information about the registered sheet for which the subtraction value is calculated. That is, the information based on the difference between a value determined for a property detected by each sensor 20 and a value determined for the property of a registered sheet that satisfies the set condition regarding the relationship with the property detected by the sensor 20 may be information based on the subtraction value described above.

In this exemplary embodiment, information about a registered sheet is information about a trouble that has occurred in a process in which an image is formed on a registered sheet that satisfies the set condition regarding the relationships with the properties detected by the sensors 20.

In a case where a trouble that has occurred in a process in which an image is formed on the registered sheet does not satisfy a set condition, the processor 11 does not output information about the trouble. Examples of the set condition regarding a trouble include the notification condition described above (see FIG. 7).

Note that this exemplary embodiment states that the notification condition is a condition that a trouble has occurred in printing a predetermined number of times or more in the last one year; however, the notification condition is not limited to the above-described condition.

The notification condition may be a condition that, for example, a trouble has occurred in printing a predetermined number of times or more regardless of the period in which the trouble has occurred. The notification condition may be a condition that a predetermined trouble has occurred in printing. The predetermined trouble may be any trouble and is, for example, poor fixing.

That is, as the notification condition, any condition may be set as long as the condition is related to a trouble with printing.

In this exemplary embodiment, a registered sheet that is applicable to a printing condition using a target sheet and a target registered sheet for which a trouble notification is sent are registered sheets with which the smallest norm value is associated; however, this exemplary embodiment is not limited to this.

The processor 11 may indicate plural registered sheets as candidates for the registered sheet that is applicable to a printing condition using a target sheet or as candidates for the target registered sheet for which a trouble notification is sent. For example, the processor 11 may indicate all registered sheets with each of which a norm value less than or equal to the sameness threshold is associated or all registered sheets with each of which a norm value less than or equal to the similarity threshold is associated as candidates for the registered sheet that is applicable to a printing condition using a target sheet or as candidates for the target registered sheet for which a trouble notification is sent. The processor 11 may indicate all registered sheets with each of which a norm value less than or equal to a predetermined value is associated or all registered sheets each of which has a ranking that is within a predetermined range from the top ranking for which the norm value is smallest as candidates for the registered sheet that is applicable to a printing condition using a target sheet or as candidates for the target registered sheet for which a trouble notification is sent. Further, the processor 11 may display information indicating each of the registered sheets indicated as candidates on the display device 14 in a form so as to allow a user to select any of the registered sheets indicated as candidates. When the user selects any of the registered sheets, the processor 11 may set a printing condition that has been set for the selected registered sheet as a printing condition of the target sheet. Further, the processor 11 may display information about a trouble that has occurred in printing using the selected registered sheet on the display device 14 as information about a trouble that has occurred in printing using a registered sheet related to the target sheet.

This exemplary embodiment states that the sensors 20 are provided in the accommodation unit 10T of the image forming apparatus 10; however, this exemplary embodiment is not limited to this.

The sensors 20 may be provided in a sheet conveyance path in the image forming apparatus 10. For example, the sensors 20 may be provided downstream of the accommodation unit 10T in the sheet conveyance direction and upstream of a region in which an image is formed on a sheet by the image former 16 in the sheet conveyance direction.

In this exemplary embodiment, the image forming apparatus 10 identifies the relationship between a target sheet and a registered sheet; however, an apparatus used in identification of the relationship between a target sheet and a registered sheet is not limited to the image forming apparatus 10.

An apparatus different from the image forming apparatus 10 and including the processor 11 may use the results of detection by the sensors 20 to identify the relationship between a target sheet and a registered sheet. Further, this apparatus may output information about a registered sheet that satisfies a set condition regarding the relationships with the properties detected by the sensors 20. Examples of the apparatus including the processor 11 include a computer, a smartphone, and a tablet-type information terminal. The apparatus including the processor 11 and the sensors 20 are also regarded as the information processing apparatus.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
    a sensor assembly that detects at least a chemical property of a target sheet; and
    a processor configured to:
        compare the detected chemical property of the target sheet with stored properties of a registered sheet, so as to determine whether the target sheet satisfies a set condition with respect to a relationship with the registered sheet; and
        output information including a trouble history of the registered sheet, the information being output when the target sheet satisfies the set condition with respect to the registered sheet, wherein
    the sensor assembly includes at least an infrared sensor that detects the chemical property by emitting an infrared ray to the target sheet, the infrared sensor detecting whether an additive has been added to the target sheet.

2. The information processing apparatus according to claim 1, wherein
    the sensor assembly further includes an ultrasonic sensor that detects a further property by emitting an ultrasonic wave to a sheet or an electric sensor that detects an electric property of the properties on the basis of an electrical resistance, and the infrared sensor, and
    the processor is configured to output information about a sheet that satisfies the condition regarding relationships with the further property detected by the ultrasonic sensor or the electric property detected by the electric sensor and the chemical property detected by the infrared sensor.

3. The information processing apparatus according to claim 2, wherein
    the ultrasonic sensor or the electric sensor detects a physical property of the target sheet.

4. The information processing apparatus according to claim 2, wherein
the sensor assembly further includes a color sensor that detects a color of the target sheet or a brightness of the target sheet, and
the processor is configured to output information about the target sheet that satisfies the condition regarding relationships with the chemical property detected by the infrared sensor or the electric property detected by the electric sensor and the color or the brightness detected by the color sensor.

5. The information processing apparatus according to claim 1, wherein the processor is configured not to output the information in a case where the trouble that has occurred in the process does not satisfy the set condition.

6. An image forming system comprising:
a sensor assembly that detects at least a chemical property of a target sheet;
a processor configured to:
compare the detected chemical property of the target sheet with stored properties of a registered sheet, so as to determine whether the target sheet satisfies a set condition with respect to a relationship with the registered sheet; and
output information including a trouble history of the registered sheet, the information being output when the target sheet satisfies the set condition with respect to the registered sheet; and
an image former that forms an image on the sheet for which the property is detected by the sensor, wherein
the sensor assembly includes at least an infrared sensor that detects the chemical property by emitting an infrared ray to the target sheet, the infrared sensor detecting whether an additive has been added to the target sheet.

7. An information processing apparatus comprising:
a sensor assembly that detects at least a chemical property of a target sheet; and
means for comparing the detected chemical property of the target sheet with stored properties of a registered sheet, so as to determine whether the target sheet satisfies a set condition with respect to a relationship with the registered sheet; and
means for output information including a trouble history of the registered sheet, the information being output when the target sheet satisfies the set condition with respect to the registered sheet, wherein
the sensor assembly includes at least an infrared sensor that detects the chemical property by emitting an infrared ray to the target sheet, the infrared sensor detecting whether an additive has been added to the target sheet.

* * * * *